United States Patent
Düll et al.

(10) Patent No.: US 9,952,566 B2
(45) Date of Patent: Apr. 24, 2018

(54) METHOD FOR CONTROLLING AND/OR REGULATING A TECHNICAL SYSTEM IN A COMPUTER-ASSISTED MANNER

(71) Applicant: Siemens Aktiengesellschaft, Munich (DE)

(72) Inventors: Siegmund Düll, München (DE); Alexander Hentschel, München (DE); Steffen Udluft, Eichenau (DE)

(73) Assignee: Siemens Aktiengesellschaft, Munich (DE)

( * ) Notice: Subject to any disclaimer, the term of this patent is extended or adjusted under 35 U.S.C. 154(b) by 482 days.

(21) Appl. No.: 14/428,002

(22) PCT Filed: Aug. 23, 2013

(86) PCT No.: PCT/EP2013/067520
§ 371 (c)(1),
(2) Date: Mar. 13, 2015

(87) PCT Pub. No.: WO2014/040839
PCT Pub. Date: Mar. 20, 2014

(65) Prior Publication Data
US 2015/0227121 A1     Aug. 13, 2015

(30) Foreign Application Priority Data
Sep. 17, 2012 (DE) .......... 10 2012 216 574

(51) Int. Cl.
*G05B 13/02* (2006.01)
*G06N 7/00* (2006.01)

(52) U.S. Cl.
CPC ....... *G05B 13/027* (2013.01); *G05B 13/0265* (2013.01); *G06N 7/00* (2013.01)

(58) Field of Classification Search
None
See application file for complete search history.

(56) References Cited

U.S. PATENT DOCUMENTS 8,160,978 B2   4/2012   Schäfer
8,260,441 B2   9/2012   Scheegaβ
(Continued)

FOREIGN PATENT DOCUMENTS

DE    19904974 A1    8/2000
DE    102007001025 A1    7/2008
(Continued)

OTHER PUBLICATIONS

Hentschel A. et al: An efficient algorithm for optimizing adaptive quantum metrology processes, Physical Review Letters 107, 233601, pp. 233601-1-233601-5, 2011.
(Continued)

*Primary Examiner* — Alan S Chen
(74) *Attorney, Agent, or Firm* — Beusse Wolter Sanks & Maire

(57) ABSTRACT

A computer-implemented method for controlling and/or regulating a technical system, in which actions to be carried out on the technical system are first of all determined using an action selection rule which was determined through the learning of a data-driven model and, in particular, a neural network. On the basis of these actions a numerical optimization searches for actions which are better than the original actions according to an optimization criterion. If such actions are found, the technical system is regulated or controlled on the basis of these new actions, such that the corresponding actions are applied to the technical system in succession. The method is suitable, in particular, for regulating or controlling a gas turbine, wherein the actions are preferably optimized with respect to the criterion of low pollutant emission or low combustion chamber humming.

19 Claims, 2 Drawing Sheets

(56) References Cited

U.S. PATENT DOCUMENTS 8,554,707 B2 10/2013 Schäfer
2010/0257866 A1* 10/2010 Schneegass .......... G05B 13/027
60/773

FOREIGN PATENT DOCUMENTS

DE 102007017259 A1 10/2008
DE 102008020379 A1 10/2009

OTHER PUBLICATIONS

Eberhart R. et al: A new optimizer using particle swarm theory, Proceedings of the Sixth International Symposium on Micro Machine and Human Science, pp. 39-43, 1995.
Banks A. et al: A review of particle swarm optimization. Part I: background and development, Natural Computing, Springer Netherlands, vol. 6, Issue 4, pp. 467-484; 2007.
Banks A. et al: A review of particle swarm optimization. Part II: hybridisation, combinatorial, multicriteria and constrained optimization, and indicative applications, Natural Computing, Springer Netherlands, vol. 7, Issue 1 (2008), pp. 109-124.
Mukkopadhyay D.M. et al: Genetic algorithm: A Tutorial Review, International Journal of Grid and Distributed Computing, vol. 2, No. 3, pp. 25-32, 2009.

\* cited by examiner

METHOD FOR CONTROLLING AND/OR REGULATING A TECHNICAL SYSTEM IN A COMPUTER-ASSISTED MANNER

CROSS REFERENCE TO RELATED APPLICATIONS

This application is the US National Stage of International Application No. PCT/EP2013/067520 filed Aug. 23, 2013, and claims the benefit thereof. The International Application claims the benefit of German Application No. DE 102012216574.6 filed Sep. 17, 2012. All of the applications are incorporated by reference herein in their entirety.

FIELD OF INVENTION

The invention relates to a method for controlling and/or regulating a technical system, in particular an energy generation installation, in a computer-assisted manner.

BACKGROUND OF INVENTION

When controlling and/or regulating technical systems, it is often desirable to influence the operation of the technical system by carrying out corresponding actions in such a manner that the behavior of the technical system is optimized with respect to particular criteria. For example, when operating a gas turbine, it is useful to reduce the exhaust gas emissions produced by the turbine and to keep the combustion dynamics of the combustion chamber of the gas turbine (also referred to as combustion chamber humming) as low as possible. In this case, it is possible to influence, for example, parameters relating to the supply of gas to the combustion chamber of the gas turbine.

The prior art discloses computer-assisted methods which are used to determine an action selection rule, according to which actions are determined for corresponding successive states of the technical system which are characterized by suitable state variables of the system, which actions are optimal with respect to an optimization criterion, for example the above-mentioned low pollutant emission and low combustion chamber humming. Documents [1] DE 10 2007 001 025 A1 and [2] DE 10 2008 020 379 A1 describe the determination of an action selection rule on the basis of the learning of a recurrent neural network with training data comprising known states and actions. According to the action selection rule, an action sequence is output for a current state of the technical system taking into account past states on the basis of an optimality criterion. The action sequence can be determined in a short computing time during real operation of the technical system. However, in this case, it is not always ensured that the actions determined according to the action selection rule are optimal in the sense of the optimality criterion. Discrepancies may occur, in particular, when the states of the technical system, for which the action sequence is determined, are in operating ranges which are far away from the training data.

SUMMARY OF INVENTION

An object of the invention is therefore to provide a method for controlling and/or regulating a technical system in a computer-assisted manner, which method quickly and accurately determines the actions to be carried out on the technical system according to an optimization criterion.

This object is achieved by the independent patent claims. Developments of the invention are defined in the dependent claims.

The method according to the invention is used to control and/or regulate a technical system in a computer-assisted manner. In this case, the technical system is, in particular, an energy generation installation and, in one particularly embodiment, a gas turbine, as described in more detail further below. If appropriate, however, the technical system may also be an energy generation installation in the form of a regenerative energy generation installation, for example a wind turbine. The dynamic behavior of the technical system is respectively characterized in the method according to the invention for a plurality of times by a state of the technical system and an action carried out on the technical system in this state, a respective action at a respective time resulting in a new state of the technical system at the next time. In this case, an action sequence is one or more actions to be successively carried out on the technical system. A state of the technical system comprises one and optionally more state variables which are operating states of the technical system or variables which influence the operation of the technical system. In contrast, actions are the change of one or more action variables, the action variables possibly also being able to be state variables which can be changed when regulating and/or controlling the technical system.

In a step a) of the method according to the invention, an action selection rule, which was determined by learning a data-driven model on the basis of training data comprising data records comprising known states and actions at a plurality of times, is used to determine a first action sequence for the state of the technical system at a current time (that is to say at the time at which a control and/or regulating intervention is intended to be carried out), which first action sequence comprises one or more actions to be successively carried out on the technical system and comprises an initial action at the current time, the first action sequence being based on an optimization criterion for operating the technical system, which is taken into account when learning the data-driven model, and having a measure of quality with respect to the optimization criterion. The higher the measure of quality, the better the corresponding optimization criterion is satisfied. In one embodiment, the state of the technical system at the current time and a history of further past states are taken into account when determining the first action sequence.

In a step b), a numerical optimization method is then used to search for those second action sequences which have a measure of quality higher than the measure of quality of the first action sequence, which second action sequences comprise one or more actions to be successively carried out on the technical system and comprise an initial action at the current time. In this case, the search is started with a number of starting action sequences (that is to say at least one starting action sequence) which are determined by varying a number of initially provided action sequences comprising the first action sequence. In this case, advantages are given to starting action sequences having a slight variation in comparison with a corresponding initially provided action sequence on the basis of a priority criterion. The starting action sequences are then iteratively changed in the further course according to the numerical optimization method rule in order to hereby find second action sequences having a higher measure of quality.

According to step b), a numerical optimization method is therefore started in a local area around the first action sequence or further action sequences used for initialization.

The magnitude of the variation, that is to say the disparity between an initially provided action sequence and the starting action sequence produced therefrom by means of variation, can be defined in a suitable manner, for example on the basis of a metric for each action in the action sequence. In this case, the variation of an action is greater, the greater the interval according to the metric between this action in the action sequence which has been varied and the corresponding action in the action sequence which has not been varied. A suitable metric may likewise be defined in the space of the action sequences, with the result that the total variation of the action sequence is determined using the interval between the action sequence which has been varied and the action sequence which has not been varied according to the metric. In addition, the priority criterion may be different. For example, the priority criterion may be stipulated as a probability criterion. That is to say, according to one or more probability functions, the probability of an action sequence which has been varied being used as the starting action sequence in the numerical optimization method increases, the lower the variation of this action sequence in comparison with the underlying initially provided action sequence. The priority criterion may likewise be based on a hard threshold value criterion, in which case those action sequences whose variation exceeds a predetermined threshold are not allowed as the starting action sequences in the numerical optimization method. In this case, a corresponding threshold value may be stipulated for each action in the action sequence, for example, in which case the variation of the respective action must not exceed the threshold value. If the variation is described using a metric for the entire action sequence, a single threshold value may also be stipulated for the entire sequence.

In a step c) of the method according to the invention, if one or more second action sequences having a higher measure of quality are found in step b), at least some of the successive actions in the second action sequence having the highest measure of quality are finally carried out on the technical system. If no second action sequences having a higher measure of quality are found, at least some of the successive actions in the first action sequence are carried out. After some of the actions in the first and second action sequences have correspondingly been carried out, steps a) to c) of the method according to the invention can then be carried out again in order to determine a new control and/or regulating intervention.

The method according to the invention has the advantage that an action selection rule learned using a data-driven model can be improved using a numerical optimization method, in which case a prioritized local search (optimization) for (second) action sequences ensures that action sequences having a higher measure of quality than the measure of quality of the first action sequence can be quickly calculated and the method can therefore be used during real operation of the technical system.

In one embodiment, the learned data-driven model used in step a) of the method according to the invention comprises a neural network and, in particular, a recurrent neural network. In one variant, the neural network which is described in document [1] DE 10 2007 001 025 A1 and in document [2] DE 10 2008 020 379 A1 and in which a recurrent neural network is combined with a feed-forward network in order to determine an action selection rule is used. That is to say, the action selection rule according to step a) was determined in this case using the method from document [1] DE 10 2007 001 025 A1 or [2] DE 10 2008 020 379 A1. The entire disclosure content of these documents is incorporated in the present application by reference. In modified embodiments, instead of a neural network, it is also possible to use data-driven models which are based on Gaussian processes and/or regression trees and/or support vector regression. Such models are sufficiently well known from the prior art and are therefore not explained in any more detail.

In one embodiment, the numerical optimization method used in step b) of the method according to the invention is a non-convex heuristic optimization method and/or a gradient-free stochastic search method. Corresponding methods are known from the prior art. In one embodiment, particle swarm optimization and/or an evolutionary algorithm and/or a genetic algorithm and/or simulated annealing is/are used as the numerical optimization method. These methods are also known from the prior art. A more detailed description of particle swarm optimization is found in documents [3] to [6], specifically [3] Hentschel, Sanders, "An efficient algorithm for optimizing adaptive quantum metrology processes", Physical Review Letters 107, 233601, 2011; [4] J. Kennedy, R. C. Eberhart, and Y. Shi, "A new optimizer using particle swarm theory", Proceedings of the Sixth International Symposium on Micro Machine and Human Science, pp. 39-43, 1995; [5] A. Banks, J. Vincent, C. Anyakoha, "A review of particle swarm optimization. Part I: background and development", Natural Computing, Springer Netherlands, Volume 6, Issue 4 (2007), pp. 467-484; and [6] A. Banks, J. Vincent, C. Anyakoha, "A review of particle swarm optimization. Part II: hybridisation, combinatorial, multicriteria and constrained optimization, and indicative applications", Natural Computing, Springer Netherlands, Volume 7, Issue 1 (2008), pp. 109-124, the entire disclosure content of which is incorporated in the present application. A description of genetic algorithms is found in document [7] D. M. Mukhopadhyay, M. O. Balitanas, A. Farkhod, S H Jeon, D. Bhattacharyya, "Genetic algorithm: A Tutorial Review", International Journal of Grid and Distributed Computing, Vol. 2, No. 3 (2009), the entire disclosure content of which is likewise incorporated in the present application.

In another refinement of the method according to the invention, the action selection rule used in step a) accesses a simulation model which is intended for the technical system and is used to determine, from an action in the first action sequence which is carried out for a state at a time, a successor state of the technical system at the next time, the action selection rule stipulating the next action in the first action sequence for the successor state. The simulation model may also be taken into account when learning the action selection rule. In particular, the simulation model may again have been determined by learning a neural network or a recurrent neural network. In this case, the neural network used to learn the simulation model can also be used when learning the action selection rule, as is the case in documents [1] DE 10 2007 001 025 A1 and [2] DE 10 2008 020 379 A1. There, a simulation model of the technical system is first of all learned on the basis of a recurrent neural network and the action selection rule is then learned in such a manner that the learned recurrent neural network is combined with a feed-forward network.

In another refinement of the method according to the invention, the simulation model is also used to determine successor states of the technical system from the respective actions in the second action sequence, an assessment measure being determined for each successor state of the first and second action sequences, and the measure of quality being higher, the higher the sum of assessment measures of all successor states in the first and second action sequences.

In this case, the quality of an action sequence is determined on the basis of actions in the action sequence which are to be carried out in future.

In another refinement of the method according to the invention, steps a) to c) are repeated at predetermined intervals of time and the first and second action sequences at least partially carried out in step c) are stored in a database in this case, with the first action sequence and those action sequences from the database whose initial actions were carried out in states of the technical system which, according to a metric in the space of the states, have an interval from the state of the technical system at the current time which is less than or less than or equal to a predetermined threshold value being used in step b) as initially provided action sequences. In this manner, the numerical optimization method can be sped up or can result more quickly in an improved action by taking into account previously determined action sequences.

In another refinement of the method according to the invention, a numerical optimization method which has already been concluded is continued if one or more criteria are present, in which case, during the continuation, a search is carried out for second action sequences having a higher measure of quality than the first action sequence without the priority criterion being taken into account when determining the starting action sequences. In this case, the criterion or criteria comprise(s), in particular, the criterion that a computing capacity available for the method exceeds a predetermined threshold. The numerical optimization method can therefore be improved when there is sufficient computing capacity. If an even better second action sequence (that is to say a second action sequence having an even higher measure of quality) is found when continuing the numerical optimization method, this second action sequence is stored in the database described above, in which case the second action sequence previously found using the optimization method is overwritten if necessary.

In another refinement of the method according to the invention, the learning of the data-driven model is continued at predetermined times on the basis of the training data and further training data, the further training data comprising data records each comprising an action sequence at least partially carried out in step c) and at least the state of the technical system in which this action sequence was started. In this case, in addition to the state for which the action sequence was started, a data record comprises a history of successive states before this state.

In one variant of the embodiment just described, whenever a data record from the further training data is used instead of the optimization criterion for operating the technical system when continuing learning, the optimization criterion of the smallest possible discrepancy between the action sequence determined using the data-driven model and the action sequence according to the data record from the further training data is taken into account.

In one variant, the method according to the invention is used to regulate and/or control an electrical energy generation installation comprising a gas turbine. In this case, a state of the gas turbine comprises one or more of the following state variables, an action relating, in particular, to a change of one or more of the following state variables: —the compressor efficiency of the gas turbine; —the turbine efficiency of the gas turbine; —the regulated exhaust gas temperature of the gas turbine; —the position of one or more guide blades, in particular in the compressor of the gas turbine; —the rotational speed of the gas turbine; —one or more pressures and/or temperatures in the gas turbine, in particular the inlet temperature and/or the inlet pressure and/or the outlet temperature and/or the outlet pressure in the compressor and/or in the turbine; —the temperature in the environment in which the gas turbine is operated; —the humidity in the environment in which the gas turbine is operated; —the air pressure in the environment in which the gas turbine is operated; —one or more mass and/or volumetric flows; —one or more parameters of a cooling and/or auxiliary system and/or lubricating oil and/or bearing systems in the gas turbine, in particular the position of one or more valves for supplying cooling air; —the performance of the gas turbine, in particular a percentage performance value; —the fuel quality of the gas turbine; —the pollutant emission of the gas turbine, in particular the emission of nitrogen oxides and/or carbon monoxide; —the temperature of one or more turbine blades of the gas turbine; —the combustion dynamics of the combustion chamber of the gas turbine; —one or more parameters relating to the supply of gas to the combustion chamber of the gas turbine; —the amount of gas supplied to the gas turbine; —bearing and/or housing vibrations in the gas turbine.

In the case of a gas turbine, the lowest possible pollutant emission of the gas turbine and/or the lowest possible dynamics of the combustion chamber of the gas turbine, in particular, is/are suitable as the optimization criterion for operating the technical system.

In addition to the method described above, the invention also relates to an apparatus for controlling and/or regulating a technical system, in particular an electrical energy generation installation, in a computer-assisted manner, the apparatus comprising a computer unit which can be used to carry out the method according to the invention or one or more variants of the method according to the invention.

The invention also relates to a technical system, in particular an energy generation installation for example a gas turbine, which comprises the apparatus just described.

In addition, the invention comprises a computer program product having a program code which is stored on a machine-readable carrier and is intended to carry out the method according to the invention or one or more variants of the method according to the invention when the program code is executed on a computer.

BRIEF DESCRIPTION OF THE DRAWINGS

Exemplary embodiments of the invention are described in detail below using the accompanying figures, in which.

DETAILED DESCRIPTION OF INVENTION

The method according to the invention is described below using the example of a technical system in the form of a gas turbine. In this case, the aim of the method is to determine, in a corresponding state of the gas turbine, a sequence of optimal actions to be carried out in this state and in successor states. In this case, a state is a vector comprising a multiplicity of state variables and may comprise the variables explained above. An action relates to the change of one or more state variables which can be adjusted in the gas turbine. In the method according to the invention, parameters relating to the supply of gas to the combustion chamber of the gas turbine, for example, have proved to be practical as state variables. In this case, corresponding actions relate to the changes of these parameters. The parameters comprise, in particular, corresponding fuel proportions which are injected into the combustion chamber of the gas turbine at different positions. These proportions may accordingly be changed, thus generating actions. In this variant of the invention, optimal actions are those actions which result in low humming in the combustion chamber in the long term. If appropriate, the actions may also be determined with regard to other or further optimization criteria, for example lowest possible emissions of pollutants.

As part of the embodiment explained here, a current state of the technical system is taken as a basis for suitably stipulating an action sequence of actions to be carried out in the current state and in a plurality of future states taking into account a number of past states. In this case, an action selection rule, which was determined by learning a neural network using a method known per se, is combined with a numerical optimization method in the form of particle swarm optimization, thus obtaining an improved action selection rule which can be used to determine optimal actions, for example with regard to low combustion chamber humming, during operation of the technical system.

Figure 1:
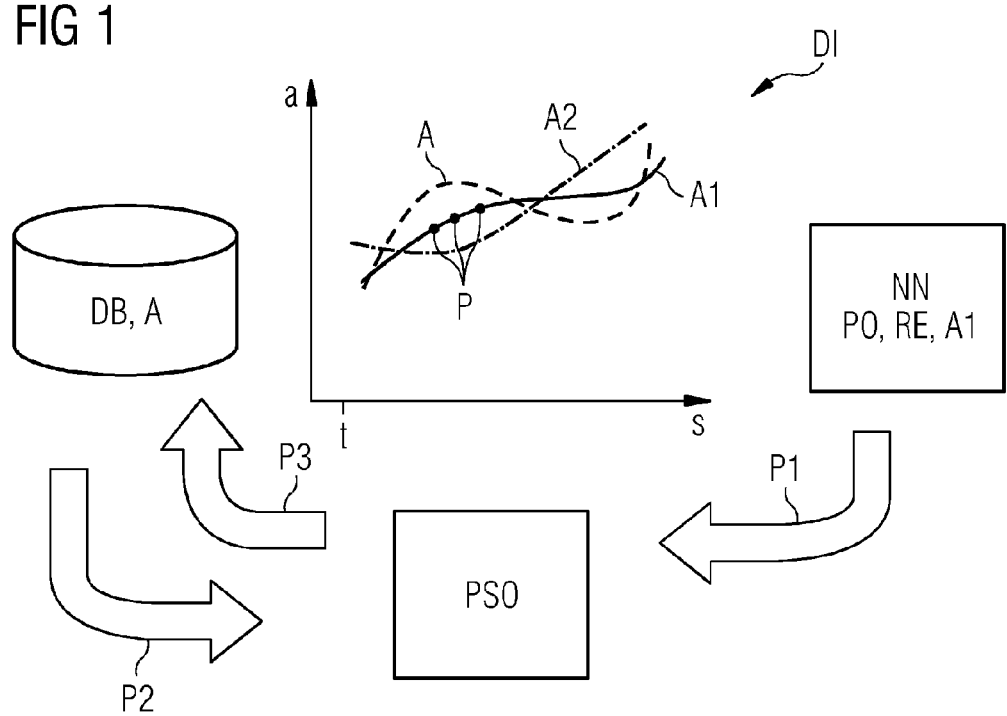
FIG. 1 shows a schematic illustration of one embodiment of the method according to the invention.

The starting point for the method explained below using FIG. 1 is an action selection rule PO which has already been determined in advance by learning a neural network NN using a method known per se. In one embodiment, the action selection rule was determined on the basis of the recurrent neural network described in document [1]. In order to determine the action selection rule, a recurrent neural network, which was initially learned using corresponding training data for representing the dynamic behavior of the technical system, was combined with a feed-forward network according to this document in order to thereby derive the action selection rule. A corresponding optimization criterion was taken into account when determining the action selection rule, which optimization criterion is used to stipulate the quality RE (RE=reward) of an action sequence determined using the action selection rule. In this case, the quality RE is a sum of corresponding assessment measures which are determined for each state which is assumed when carrying out the action sequence in the technical system. The higher the assessment measure, the better the assessment of the corresponding state. In this case, the optimization criterion is the largest possible sum of the assessment measures of the corresponding action sequence. In other words, the measure of quality is the sum of the assessment measures which is intended to be as large as possible.

On the basis of a current time, a first action sequence A1 comprising a current action and actions to be carried out in future is determined using the action selection rule PO learned via the neural network NN. This is illustrated using the graph DI in FIG. 1. In this case, the states s of the technical system which are assumed at successive times are illustrated along the abscissa of the graph, in which case the current regulation and/or control time is denoted using t. The ordinate represents the actions a. The line A1 is used to illustrate the first action sequence which was determined by the neural network NN. This line consists of a multiplicity of individual actions at the current time and at future times, as indicated by means of three dots P by way of example. The lines A and A2 which are explained further below and likewise represent action sequences are also composed in the same manner. Depending on the training data used for the neural network, it is not always ensured in this case that the action sequence A1 output via the network is also actually the best action sequence in the sense of the optimization criterion. Accordingly, in the embodiment in FIG. 1, the action sequence A1 is processed further using a numerical optimization method in the form of particle swarm optimization PSO, which is indicated by the arrow P1.

Particle swarm optimization methods are known per se from the prior art, as proved by documents [3] to [6] already mentioned at the outset. In this case, starting from the first action sequence A1, the swarm-based optimization method PSO searches for second action sequences A2 which result in a higher quality RE. If such second action sequences are found, that second action sequence having the highest quality is stored in a database DB, as indicated by the arrow P3. If not, the first action sequence is stored in the database DB. The action sequences in the database DB are denoted using A in FIG. 1. Finally, the second action sequence having the highest quality or the first action sequence, if no second action sequence is found, is carried out on the technical system.

The particle swarm optimization PSO is initialized using the first action sequence A1. Furthermore, the database DB is searched for further action sequences A which can be used for initialization, which is indicated by the arrow P2. An action sequence from the database DB is used to initialize the swarm-based optimization method when the state of the technical system, starting from which the initial action in the action sequence from the database was carried out, is similar to the state of the technical system at the time t. In this case, a metric is stipulated in the space of the states, in which case the states are considered to be similar if the interval between states undershoots a predetermined threshold value. If corresponding states and therefore action sequences are found in the database DB, they are also used to initialize the swarm-based algorithm. In this scenario in FIG. 1, a further action sequence A which comes from the database DB and is also used for initialization is indicated as a dashed line in the graph DI.

The search according to the particle swarm optimization is started with a number of starting action sequences. In order to determine the starting action sequences, the corresponding actions in the action sequences A1 and A are varied, in which case local variations around the corresponding action sequences are mainly taken into account. In one embodiment, this is achieved by means of a probability function, according to which greater variations of the individual actions in the corresponding action sequence become all the more unlikely. If appropriate, a corresponding metric can also be stipulated in the space of the action sequences, which metric is used to stipulate the magnitude of a variation between an action sequence which has been varied and an action sequence which has not been varied. Advantages are then again given to action sequences having smaller variations using a corresponding probability measure. If appropriate, it is also possible to stipulate hard threshold values of the variations which must not be exceeded. This ensures that the swarm-based optimization method concentrates its search locally around the known action sequences, with the result that improved action sequences can be determined during real-time operation of the technical system.

In the scenario in FIG. 1, a second action sequence A2 which is indicated by a dash-dotted line in the graph DI is finally found. This action sequence has a higher measure of quality RE than the original first action sequence A1. As indicated by the arrow P3, this action sequence is then stored in the database DB and the technical system is then controlled on the basis of this action sequence by virtue of the actions according to this action sequence being carried out at corresponding operating times.

In one embodiment, if there is sufficient computing time available, particular swarm-based optimization runs which have previously been carried out are also continued again, the variation of the action sequences for the purpose of determining the starting action sequences no longer being restricted in this case and being prioritized using a probability function. In particular, the swarm-based optimization methods are continued in this case for those states of the technical system which have frequently been previously assumed and for which there was a great discrepancy between the second action sequence determined and the first action sequence. This makes it possible to further improve the optimization method. If an even better second action sequence is found in this case, it is stored in the database DB and replaces the previously found second action sequence.

Figure 2:
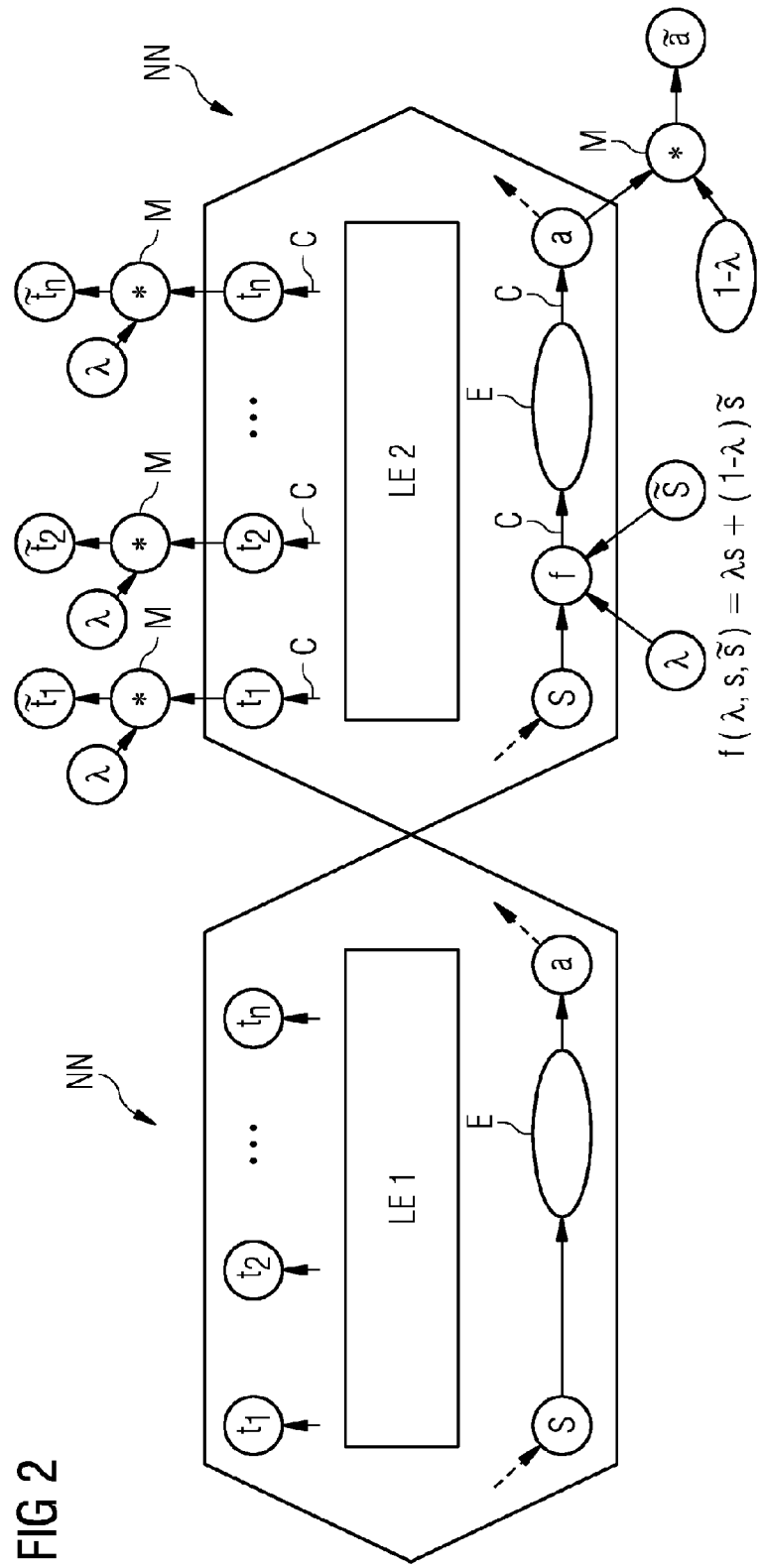
FIG. 2 shows a schematic illustration which illustrates the continuation of the learning of a recurrent neural network according to one embodiment of the method according to the invention.

FIG. 2 shows a special embodiment of the method in FIG. 1, in which the neural network NN which is used to determine the first action sequence is learned further at predetermined intervals of time. The left-hand part of FIG. 2 represents the conventional learning LE1 of the neural network NN which is carried out in advance in order to thereby obtain an action selection rule for determining corresponding first action sequences. In this case, states s of the technical system which are included as input variables by the network and the action sequence a determined therefrom and corresponding assessments in the form of targets $t_1, t_2, \ldots, t_n$ are indicated. The neural network is learned with respect to a maximum sum of the assessments. The rest of the network is only schematically represented by an ellipse E. In order to learn the network NN, use is made of training data comprising corresponding states and actions which have been assumed by the technical system. In this case, the learning method is a reinforcement learning method.

The right-hand part of FIG. 2 now shows a modification of the learning method LE1 which is denoted using LE2 and is carried out at regular intervals as part of the embodiment described here. In this case, in addition to the original training data which were used to learn the network NN according to the learning method LE1, further training data which are composed of data records comprising the action sequences ã and the states s̃ are taken into account. In this case, the action sequences ã are those action sequences which were ultimately applied to the technical system in the method in FIG. 1. The states s̃ are the states of the technical system which are assumed when carrying out the actions in the sequence ã. Only the weighting matrices denoted using C are varied as part of the learning LE2. The remaining weighting matrices are set to be identical.

The function $f(\lambda, s, \tilde{s}) = \lambda s + (1-\lambda)\tilde{s}$ is implemented using the neuron f. In this case, $\lambda=1$ is used if the data record used during learning comes from the original training data. In contrast, $\lambda=0$ is used if the data record comes from the further training data and therefore represents the state s̃ and the corresponding action sequence ã. The parameter $\lambda$ means that, whenever a data record from the further training data is used, the neural network is no longer optimized with regard to the targets $t_1, \ldots, t_n$ in terms of high assessments since the corresponding targets $\tilde{t}_1, \ldots, \tilde{t}_n$ are set to 0 for $\lambda=0$. This is illustrated by the corresponding multiplication nodes M which are connected downstream of the targets $t_1, t_2, \ldots, t_n$. The function f or the multiplication node M connected downstream of the action a means that the training data s̃ and ã of the further training data are included in the neural network. In contrast, if a data record in the training data comes from the original training data, $\lambda=1$ is set, whereupon the learning method corresponds to the original learning method LE1.

The learning method LE2 just described optimizes the neural network for further training data, which represent improved action sequences, with regard to the fact that there is a good match between the action sequence output by the network and the action sequence ã in the further training data. This always further improves the output of the neural network which is produced during the method.

The above-described embodiments of the method according to the invention have a number of advantages. In particular, an action selection rule learned using a data-driven model can be improved in real time during operation of the technical system by means of combination with a numerical optimization method and, in particular, particle swarm optimization, in which case local variation of corresponding action sequences ensures that little computing time is required for the numerical optimization method.

BIBLIOGRAPHY

[1] DE 10 2007 001 025 A1
[2] DE 10 2008 020 379 A1
[3] Hentschel, Sanders, "An efficient algorithm for optimizing adaptive quantum metrology processes", Physical Review Letters 107, 233601, 2011
[4] J. Kennedy, R. C. Eberhart, and Y. Shi, "A new optimizer using particle swami theory", Proceedings of the Sixth International Symposium on Micro Machine and Human Science, pp. 39-43, 1995
[5] A. Banks, J. Vincent, C. Anyakoha, "A review of particle swarm optimization. Part I: background and development", Natural Computing, Springer Netherlands, Volume 6, Issue 4 (2007), pp. 467-484
[6] A. Banks, J. Vincent, C. Anyakoha, "A review of particle swarm optimization. Part II: hybridisation, combinatorial, multicriteria and constrained optimization, and indicative applications", Natural Computing, Springer Netherlands, Volume 7, Issue 1 (2008), pp. 109-124
[7] D. M. Mukhopadhyay, M. O. Balitanas, A. Farkhod, S H Jeon, D. Bhattacharyya, "Genetic algorithm: A Tutorial Review", International Journal of Grid and Distributed Computing, Vol. 2, No. 3 (2009).

The invention claimed is:
1. A method for controlling and/or regulating a technical system in a computer-assisted manner, in which dynamic behavior of the technical system is respectively characterized for a plurality of times by a state (s) of the technical system and an action (a) carried out on the technical system in this state, a respective action (a) at a respective time resulting in a new state (s) of the technical system at the next time, and an action sequence including actions (a) to be successively carried out on the technical system, the method comprising the steps of:
 a) determining a first action sequence (A1) for the state (s) of the technical system at a current time (t) using an action selection rule (PO) determined by learning a data-driven model (NN) on the basis of training data comprising data records comprising known states (s) and actions (a) at a plurality of times, wherein the first action sequence comprises an initial action at the current time, the first action sequence (A1) being based on an optimization criterion for operating the technical system, which is taken into account when learning the data-driven model (NN), and having a measure of quality (RE) with respect to the optimization criterion;

b) searching using a numerical optimization method (PSO) for those second action sequences (A2) which have a measure of quality (RE) higher than the measure of quality (RE) of the first action sequence (A1), wherein the second action sequences comprise an initial action (a) at the current time, the searching starting with a number of starting action sequences which are determined by varying a number of initially provided action sequences comprising the first action sequence (A1), the starting action sequences (A2) having a slight variation on the basis of a priority criterion; and c) if one or more second action sequences (A2) are found in step b), carrying out at least some of the successive actions (a) in the second action sequence (A2) having the highest measure of quality (RE) on the technical system and otherwise carrying out at least some of the successive actions (a) in the first action sequence (A1).

2. The method as claimed in claim 1, wherein the data-driven model (NN) used to determine the action selection rule (PO) comprises a neural network, a recurrent neural network, and/or is based on Gaussian processes and/or regression trees and/or support vector regression.

3. The method as claimed in claim 1, wherein the numerical optimization method (PSO) is a non-convex heuristic optimization method and/or a gradient-free stochastic search method.

4. The method as claimed in claim 1, wherein the numerical optimization method (PSO) is particle swarm optimization and/or an evolutionary algorithm and/or a genetic algorithm and/or simulated annealing.

5. The method as claimed in claim 1, wherein the action selection rule (PO) accesses a simulation model which is intended for the technical system and is used to determine, from an action (a) in the first action sequence (A1) which is carried out for a state (s) at a time, a successor state of the technical system at the next time, the action selection rule (PO) stipulating the next action in the first action sequence (A1) for the successor state.

6. The method as claimed in claim 5, wherein the simulation model is also used to determine successor states of the technical system from the respective actions (a) in the second action sequence (A2), an assessment measure being determined for each successor state of the first and second action sequences (A1, A2), and the measure of quality (RE) being higher of a sum of assessment measures of all successor states in the first and second action sequences (A1, A2).

7. The method as claimed in claim 5, wherein the simulation model being determined by learning a neural network or a recurrent neural network.

8. The method as claimed in claim 1, wherein a magnitude of a variation is defined on the basis of a metric for each action (a) in the action sequence or a metric for an entire action sequence, and/or the priority criterion is a probability criterion or a threshold value criterion.

9. The method as claimed in claim 1, wherein steps a) to c) are repeated at predetermined intervals of time and the first or second action sequences (A1, A2) at least partially carried out in step c) are stored in a database (DB) with the first action sequence (A1) and those action sequences (A) from the database (DB) whose initial actions (a) were carried out in states (s) of the technical system which, according to a metric in the space of the states (s), have an interval from the state of the technical system at the current time (t) which is less than or less than or equal to a predetermined threshold value being used in step b) as initially provided action sequences.

10. The method as claimed in claim 1, wherein a numerical optimization method (PSO) which has already been concluded is continued if one or more criteria are present, in which case, during the continuation, a search is carried out for second action sequences (A2) having a higher measure of quality than the first action sequence (A1) without the priority criterion being taken into account when determining the starting action sequences.

11. The method as claimed in claim 10, wherein the criterion or criteria comprise(s) the criterion that a computing capacity available for the method exceeds a predetermined threshold.

12. The method as claimed in claim 1, wherein the learning of the data-driven model (NN) is continued at predetermined times on the basis of the training data and further training data, the further training data comprising data records each comprising an action sequence (A1, A2) at least partially carried out in step c) and at least the state (s) of the technical system in which the action sequence (A1, A2) was started.

13. The method as claimed in claim 12, wherein, whenever a data record from the further training data is used instead of the optimization criterion for operating the technical system when continuing learning, the optimization criterion of the smallest possible discrepancy between the action sequence determined using the data-driven model (NN) and the action sequence according to the data record from the further training data is taken into account.

14. The method as claimed in claim 1, wherein an electrical energy generation installation comprising a gas turbine is regulated and/or controlled.

15. The method as claimed in claim 14, wherein a state of the gas turbine comprises one or more of the following state variables, and an action relating to a change of one or more of the following state variables:
 compressor efficiency of the gas turbine;
 turbine efficiency of the gas turbine;
 regulated exhaust gas temperature of the gas turbine;
 position of one or more guide blades,
 the position of one or more guide blades in a compressor of the gas turbine;
 rotational speed of the gas turbine;
 one or more pressures and/or temperatures in the gas turbine,
 inlet temperature and/or inlet pressure and/or outlet temperature and/or outlet pressure in the compressor and/or in the turbine;
 temperature in an environment in which the gas turbine is operated;
 humidity in the environment in which the gas turbine is operated;
 air pressure in the environment in which the gas turbine is operated;
 one or more mass and/or volumetric flows;
 one or more parameters of a cooling and/or auxiliary system and/or lubricating oil and/or bearing systems in the gas turbine,
 position of one or more valves for supplying cooling air;
 performance of the gas turbine,
 a percentage performance value of the gas turbine;
 fuel quality of the gas turbine;
 pollutant emission of the gas turbine,
 emission of nitrogen oxides and/or carbon monoxide;
 temperature of one or more turbine blades of the gas turbine;
 combustion dynamics of a combustion chamber of the gas turbine;

one or more parameters relating to the supply of gas to the combustion chamber of the gas turbine;
an amount of gas supplied to the gas turbine; and
bearing and/or housing vibrations in the gas turbine.

16. The method as claimed in claim 14, wherein the optimization criterion for operating the technical system comprises a lowest possible pollutant emission of the gas turbine and/or lowest possible dynamics of a combustion chamber of the gas turbine.

17. An apparatus for controlling and/or regulating a technical system, in a computer-assisted manner, the apparatus comprising a computer unit used to carry out a method as claimed in claim 1.

18. A technical system comprising the apparatus as claimed in claim 17.

19. A computer program product having a program code which is stored on a non-transitory machine-readable carrier and adapted to carry out the method as claimed in claim 1 when the program code is executed on a computer.

* * * * *